(12) United States Patent
Schneider et al.

(10) Patent No.: US 10,479,369 B2
(45) Date of Patent: Nov. 19, 2019

(54) ENHANCED DRIVER ATTENTION MODULE FOR DRIVING ASSISTANCE SYSTEM

(71) Applicant: Lucas Automotive GmbH, Koblenz (DE)

(72) Inventors: Georg Schneider, Urbar (DE); Sascha Heinrichs-Bartscher, Neuwied (DE)

(73) Assignee: LUCAS AUTOMOTIVE GMBH, Koblenz (DE)

( * ) Notice: Subject to any disclaimer, the term of this patent is extended or adjusted under 35 U.S.C. 154(b) by 53 days.

(21) Appl. No.: 15/823,644

(22) Filed: Nov. 28, 2017

(65) Prior Publication Data

US 2018/0154904 A1  Jun. 7, 2018

(30) Foreign Application Priority Data

Dec. 2, 2016 (DE) .......................... 10 2016 014 383

(51) Int. Cl.
| | |
|---|---|
| *B60W 40/08* | (2012.01) |
| *B60W 50/14* | (2012.01) |
| *B60W 30/09* | (2012.01) |
| *B60W 40/04* | (2006.01) |
| *B60W 50/00* | (2006.01) |

(52) U.S. Cl.
CPC ............ *B60W 40/08* (2013.01); *B60W 30/09* (2013.01); *B60W 50/14* (2013.01); *B60W 40/04* (2013.01); *B60W 2040/0818* (2013.01); *B60W 2050/0075* (2013.01); *B60W 2050/143* (2013.01)

(58) Field of Classification Search
CPC ...... B60W 40/08; B60W 30/09; B60W 50/14; B60W 2050/0075; B60W 2080/143; B60W 2040/0818; B60W 40/04
See application file for complete search history.

(56) References Cited

U.S. PATENT DOCUMENTS

| | | | | |
|---|---|---|---|---|
| 6,974,414 | B2* | 12/2005 | Victor ................... | A61B 3/113 340/576 |
| 9,014,915 | B2* | 4/2015 | Chatterjee ............ | B60W 50/08 340/576 |
| 9,251,704 | B2* | 2/2016 | Tzirkel-Hancock ........................ | G08G 1/0967 |

(Continued)

FOREIGN PATENT DOCUMENTS

| | | |
|---|---|---|
| DE | 102006043676 | 3/2008 |
| DE | 102012023245 | 6/2014 |

(Continued)

*Primary Examiner* — Thomas Ingram
(74) *Attorney, Agent, or Firm* — Tarolli, Sundheim, Covell & Tummino LLP

(57) ABSTRACT

A method for use in a driving assistance system of a motor vehicle is provided. The method comprises receiving, by a driver attention module of the driving assistance system, information from at least one input source. The information comprises at least one indicator. The at least one indicator indicates a current attention of a driver of the motor vehicle. The method further comprises deciding, based on the current attention, whether the driving assistance system is to interfere in a current driving operation of the motor vehicle. The method further comprises triggering a signal, by the driver attention module, based on the decision. A driver attention module and a driving assistance system having the driver attention module and a driver fatigue module are further provided.

9 Claims, 2 Drawing Sheets

(56) References Cited

U.S. PATENT DOCUMENTS

| | | | |
|---|---|---|---|
| 9,952,046 B1* | 4/2018 | Blacutt | B60K 28/066 |
| 10,137,902 B2* | 11/2018 | Juneja | G06F 3/16 |
| 2008/0065293 A1* | 3/2008 | Placke | B60K 31/0008 |
| | | | 701/41 |
| 2012/0101689 A1* | 4/2012 | Schramm | B60Q 9/008 |
| | | | 701/45 |
| 2012/0101859 A1 | 4/2012 | Schramm | |
| 2013/0158741 A1* | 6/2013 | Hahne | G06F 17/00 |
| | | | 701/1 |
| 2015/0054639 A1* | 2/2015 | Rosen | G06K 9/00785 |
| | | | 340/439 |
| 2015/0091740 A1* | 4/2015 | Bai | G08B 21/06 |
| | | | 340/901 |
| 2016/0104050 A1* | 4/2016 | Bogner | B60T 7/14 |
| | | | 701/70 |
| 2016/0297449 A1* | 10/2016 | Heim | B60W 40/09 |

FOREIGN PATENT DOCUMENTS

| | | |
|---|---|---|
| WO | 2014149657 | 9/2014 |
| WO | 2017071787 | 5/2017 |

* cited by examiner

ENHANCED DRIVER ATTENTION MODULE FOR DRIVING ASSISTANCE SYSTEM

RELATED APPLICATION

This application claims priority from German Application No. 10 2016 014 383.5, filed Dec. 2, 2016, the subject matter of which is incorporated herein by reference in its entirety.

TECHNICAL FIELD

In the following there are described a method for use in a driving assistance system of a motor vehicle, a driver attention module, and a driving assistance system.

BACKGROUND

In order to be able to assess and evaluate the attention of a driver of a motor vehicle to the current traffic conditions, simple input signals and input sources are currently used, such as, for example, braking activities and acceleration activities of the driver, as well as operations of an indicator and of a steering wheel angle by the driver. In addition, eye scanners are occasionally used, which are intended to detect frequent blinking as an indication of fatigue. Owing to the small number of input sources, the number of faults due to interference, by the driving assistance system, that is not wanted by the driver can be too high for a given road safety situation. Situations also arise which are detrimental to road safety if a driver is not paying attention.

Underlying Problem

The underlying object is to increase road safety and expand the applications of a driving assistance system.

Proposed Solution

According to a first aspect, a method for use in a driving assistance system of a motor vehicle is provided. The method comprises receiving, by a driver attention module of the driving assistance system, information from at least one input source. The information comprises at least one indicator. The at least one indicator indicates a current attention of a driver of the motor vehicle. The method further comprises deciding, based on the current attention, whether the driving assistance system is to interfere in a current driving operation of the motor vehicle. The method further comprises triggering a signal, by the driver attention module, based on the decision. Triggering can further comprise the driving assistance system warning the driver when it is interfering and/or warning him before it interferes.

This has the advantage of reducing the number of faults dye to interference, by the driving assistance system, that is not wanted by the driver.

A degree of attention can be contained in the at least one indicator. On the basis of the degree of attention, it can be decided whether to interfere in the driving operation.

The step of deciding can comprise interfering in the driving operation directly if there is a low degree of attention, for example without warning the driver beforehand.

The at least one input source can comprise/be an electronic device. Information about a current use, by the driver, of the electronic device can be transmitted, for example automatically, to the driver attention module. The current use can reduce the degree of attention. This can increase the likelihood of an interference.

The current attention can relate to current traffic around the motor vehicle.

Triggering of the signal can comprise operating a brake system of the motor vehicle. The brake system can begin a braking procedure on the basis of the triggered signal. This can take place autonomously or semi-autonomously via the brake system. Furthermore, the driver can be given the opportunity, via a warning to terminate the braking procedure. A predetermined length of time can be determined for terminating the braking procedure. If the predetermined length of time is exceeded, the braking procedure can be begun via the brake system.

The embodiments described above have the advantage of increasing the frequency of interference, by the driving assistance system, that is wanted by the driver, for example in the case of inattentiveness of the driver.

According to a second aspect, a driver attention module for use in a driving assistance system of a motor vehicle is provided. The driver attention module is configured to receive information from at least one input source. The information comprises at least one indicator. The at least one indicator indicates a current attention of a driver of the motor vehicle. The driver attention module is further configured to decide, based on the current attention, whether the driving assistance system is to interfere in a current driving operation of the motor vehicle. The driver attention module is further configured to trigger a signal based on the decision.

According to a third aspect, a driving assistance system is provided. The driving assistance system comprises a driver attention module according to the second aspect and a driver fatigue module. The driver attention module can cooperate with the driver fatigue module. The driver attention module can also be connected to the driver fatigue module or be part thereof. The decision can further comprise deciding, based on a combination of attention analysis and fatigue analysis, whether to interfere in the current driving operation.

The driver fatigue module can be designed to detect a viewing direction of the driver. The driver fatigue module can further be designed to determine the driver's fatigue. The driver attention module can be configured to decide, taking into account the detected viewing angle and/or fatigue, whether to interfere in the current driving operation. The viewing direction can be detected by a camera inside the motor vehicle. The camera can be part of the driver fatigue module. Based on the detected viewing direction, the driver attention module can be designed to estimate a field of vision of the driver in order then to be able to decide whether to interfere in the driving operation.

The driver fatigue module can be designed to determine a driving time and/or an ability of the motor vehicle to stay in a traffic lane. The driver attention module can be configured to decide, taking into account the determined driving time and/or the determined ability to stay in a traffic lane, whether to interfere in the current driving operation.

The driving assistance system can be configured, based on the triggered signal, to control the vehicle.

The aspects described above can lead to improved road safety.

It is clear to the person skilled in the art that the explanations set out herein are/will be implementable using hardware, software or a combination thereof. The software can be associated with programmed microprocessors or a computer generally, an ASIC (application specific integrated circuit) and/or DSPs (digital signal processors). For example, the driver attention module, the driver fatigue module and the driving assistance system can in part be in the form of a computer or a processor (for example a microprocessor, microcontroller or DSP). It is additionally clear to the person skilled in the art that, although the details described herein are described in relation to a method, these details can also be realised in a suitable device unit, a computer processor or a memory connected to a processor, the memory being provided with one or more programs which carry out the method when they are executed by the processor.

Although some of the aspects described above have been described in relation to the method, these aspects can also apply to the driver attention module and the driving assistance system. Likewise, the aspects described above in relation to the driver attention module and the driving assistance system can apply correspondingly to the method.

BRIEF DESCRIPTION OF THE DRAWINGS

Further objectives, features, advantages and possible applications will become apparent from the following description of exemplary embodiments, which are not to be interpreted as being limiting, with reference to the associated drawings. In the drawings, all the features which are described and/or depicted show the subject-matter disclosed herein on their own or in any desired combination, also independently of their grouping in the claims or their references. The dimensions and proportions of the components shown in the figures are not necessarily to scale; they can differ from those shown in embodiments for implementation.

Figure 1:
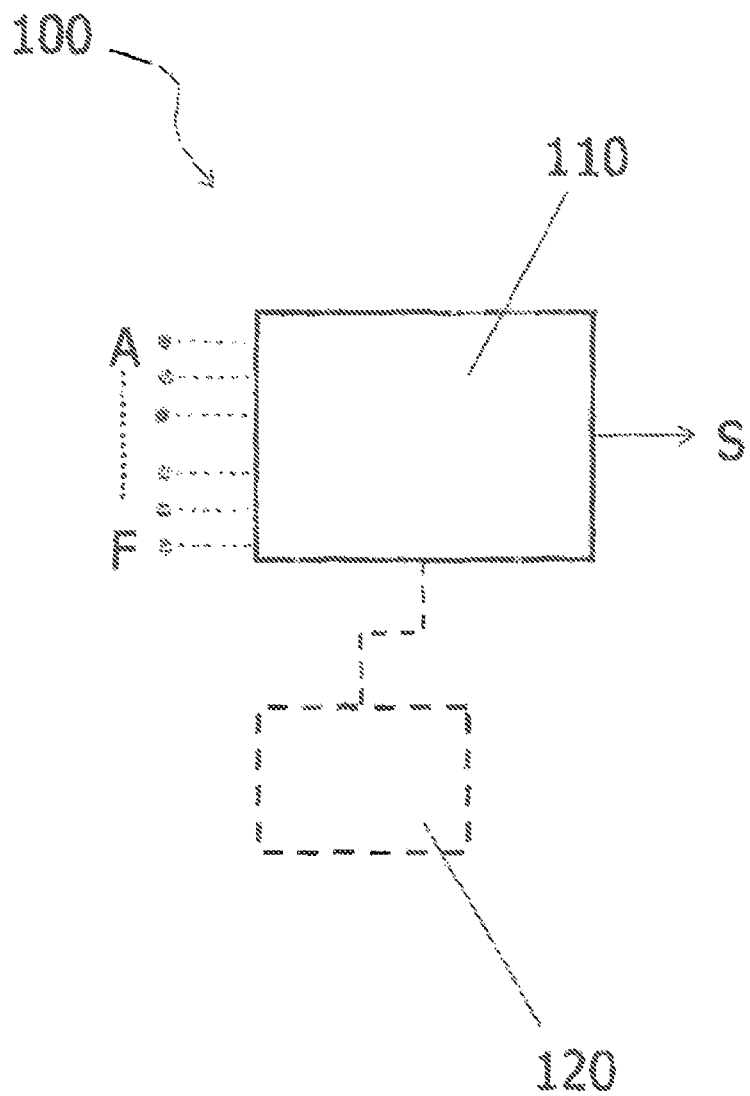
FIG. 1 shows, in schematic form, an exemplary embodiment of a driver attention module for use in a driving assistance system of a motor vehicle.

The method variants described herein of the, and their, functional and operational aspects serve merely for better understanding of their structure, functioning and properties; they do not limit the disclosure, for example, to the exemplary embodiments. The figures are partly schematic, important properties and effects in some cases being shown on a significantly enlarged scale in order to clarify the functions, active principles, technical configurations and features. Any mode of functioning, any principle, any technical configuration and any feature that is/are disclosed in the figures or in the text can be combined freely and arbitrarily with all the claims, any feature in the text and in the other figures, other modes of functioning, principles, technical configurations and features which are contained in this disclosure or follow therefrom, so that all conceivable combinations are to be assigned to the described devices. Combinations between all the individual implementations in the text, that is to say in every section of the description, in the claims, and also combinations between different variants in the text, in the claims and in the figures, are also included and can form the subject-matter of further claims. The claims also do not limit the disclosure and thus the possible combinations of all the indicated features with one another. All the disclosed features are explicitly also disclosed herein individually and in combination with all the other features.

DETAILED DESCRIPTION

In the figures, components which correspond to one another or are functionally similar are provided with the same reference numerals. The method according to the invention, the driver attention module and the driving assistance system will now be described with reference to exemplary embodiments.

In the following, specific details are described, without implying any limitation, in order to give a complete understanding of the present disclosure. It is, however, clear to a person skilled in the art that the present disclosure can be used in other exemplary embodiments which may differ from the details described below.

FIG. 1 shows, in schematic form, an exemplary embodiment of a driver attention module 110 for use in a driving assistance system 100 of a motor vehicle. The driver attention module 110 can comprise a plurality of Input sources A to F. The input sources can be an in-car telephone, a smartphone, a navigation device, a radio or a comfort function. The input sources A to F can provide information to the driver attention module 110. The information can comprise the use of an electronic device which, by way of example, can be connected to the driver attention module 110 via one of the input sources A to F.

The information can contain a frequency of use and duration of use. The information can comprise the use of a telephone, for example the inputting of a number. The information can comprise the use of multimedia devices, for example the active use or control of these multimedia devices or of a navigation device/radio, which can be integrated into the motor vehicle. The information can further comprise the use of a mirror function of a smartphone which is coupled, for example via Bluetooth, to the driving assistance system 100 or to the driver attention system 110, for example as input source F. The information can further comprise the use of a comfort function, for example climatic zone programming.

The information which is linked to the attention of the driver includes at least one indicator for indicating or representing the attention of the driver. Based on the attention of the driver, a signal S can accordingly be triggered which provides the driving assistance system 100 with a decision based on which the driving assistance system 100 controls the motor vehicle automatically. This decision accordingly depends on the likelihood that the driver is distracted, whereby, if the likelihood is high, the signal S can lead to automatic control by the driving assistance system 100.

When the driver's attention is restored, the driving assistance system 100 can be so configured that, because of the signal S not being triggered by the driver attention module 110, the driving assistance system 100 stops controlling the motor vehicle or continues controlling the motor vehicle for a predetermined period of time if the driver performs an action which contradicts the calculation by the driving assistance system 100.

The driver attention module 110 can further be connected/coupled and/or cooperate with the driver fatigue module 120. The driver fatigue module 120 provides further information via indicators which indicate the attention of the driver. The attention of the driver can hereby be determined by observing the driver during a driving operation of the motor vehicle. By means of a camera, which can be associated with the driver fatigue module 120, the drivers eye movements or environment perception activity can be determined.

The driver can accordingly look at the near environment or the far environment The driver fatigue module 120 can thereby determine whether the driver is looking at the near environment or at the far environment, so that the determination forms a basis for a decision based on which the driver attention module 110 is able to decide whether the driving assistance system 100 is to interfere in a current driving operation. Looking at the near environment can be linked to information about the use of an electronic device. Looking at the far environment can be linked to correct driving operation. Evaluation of the driver's viewing direction at a near and/or far environment can thus provide information about the attention of the driver.

The degree of attention can increase with the evaluation of the driver's viewing direction at the far environment. Likewise, the degree of attention can fall with the evaluation of the driver's viewing direction at the near environment. The far environment can be situated in the region in front of the driver in the direction of travel, for example in the direction of the windscreen. The near environment can be situated in the region of the interior, for example in the region of the dashboard.

Figure 2:
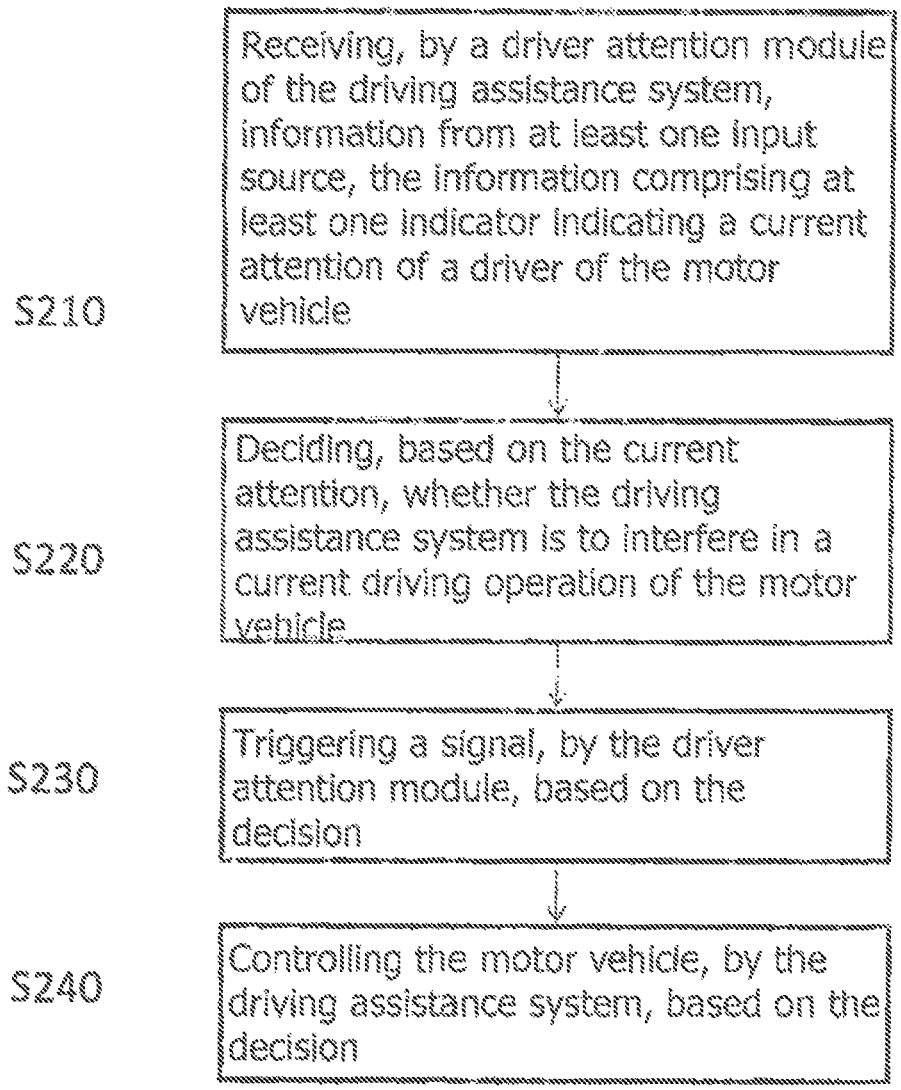
FIG. 2 shows, in schematic form, an exemplary embodiment of a method for use in a driving assistance system of a motor vehicle.

FIG. 2 shows, in schematic form, an exemplary embodiment of a method for use in a driving assistance system of a motor vehicle corresponding to FIG. 1. The method comprises receiving S102 information, by a driver attention module of the driving assistance system, from at least one input source. The information comprises at least one indicator. The at least one indicator indicates a current attention of a driver of the motor vehicle.

The method further comprises deciding S220, based on the current attention, whether the driving assistance system is to interfere in a current driving operation of the motor vehicle.

The method further comprises triggering S230 a signal by the driver attention module, based on the decision. The triggering can further comprise, when an interference is made, the driving assistance system warning the driver before the interference. Triggering of the signal can comprise controlling a brake system of the motor vehicle. The brake system can begin a braking procedure based on the triggered signal. This can take place autonomously or semi-autonomously via the brake system. The driver can further be given the opportunity, via a warning, to terminate the braking procedure. A predetermined length of time can be determined for terminating the braking procedure. If the predetermined length of time is exceeded, the braking procedure can be begun via the brake system.

The method can further comprise controlling S240 the motor vehicle, by the driving assistance system, based on the decision. Controlling S240 can correspond to controlling the brake system based on the triggered signal. A degree of attention can be contained in the at least one indicator. Based on the degree of attention, it can be decided whether to interfere in the driving operation. The decision can be based on a degree of attention which can be influenced by the activities of the driver. Where there is a low degree of attention, the driving assistance system can interfere directly with the driving operation. Where there is a high degree of attention, the driving assistance system can decide that there should be no interference.

The at least one input source of the driver attention module can compose an electronic device. This electronic device can be operated by the driver, whereby the use/operation of the electronic device can comprise the automatic sending, by the electronic device, of information to the driver attention module. The information can come from at least one input source, here the electronic device. The current attention can relate to current traffic around the motor vehicle. When a situation indicates that the driver's attention is no longer ensured, the driving assistance system can take over control S240 of the motor vehicle, in accordance with the present method, in order thus to ensure road safety.

The invention is naturally not limited in any way to the embodiments described above. On the contrary, many possibilities for modifications thereof will be apparent to an average person skilled in the art, without deviating from the underlying idea of the invention, as is defined in the accompanying claims.

The invention claimed is:

1. Method for use in a driving assistance system (100) of a motor vehicle, the method comprising:
   receiving (S210), by a driver attention module of the driving assistance system (100), information from at least one input source, the information comprising at least one indicator indicating a current attention of a driver of the motor vehicle, the at least one input source comprising an electronic device, and wherein information about a current use, by the driver, of the electronic device is transmitted to the driver attention module (110), the information about the current use of the electronic device comprising frequency of use and duration of use, and wherein the current use reduces a degree of attention;
   deciding (S220), based on the current attention, whether the driving assistance system is to interfere in a current driving operation of the motor vehicle; and
   triggering (S230) a signal, by the driver attention module (110), based on the decision.

2. Method according to claim 1, wherein a degree of attention is contained in the at least one indicator, and wherein, based on the degree of attention, it is decided whether to interfere in the driving operation.

3. Method according to claim 2, wherein the step of deciding comprises interfering directly in the driving operation when there is a low degree of attention.

4. Method according to claim 1, wherein the current attention relates to current traffic around the motor vehicle.

5. Driver attention module (110) for use in a driving assistance system (100) of a motor vehicle, which module is configured:
   to receive, from at least one input source, information comprising at least one indicator, wherein the at least one indicator indicates a current attention of a driver of the motor vehicle, the at least one input source comprising an electronic device, and wherein the module is configured to receive information about a current use, by the driver, of the electronic device, the information about the current use of the electronic device comprising frequency of use and duration of use, and wherein the current use of the electronic device reduces a degree of attention;
   to decide, based on the current attention, whether the driving assistance system is to interfere in a current driving operation of the motor vehicle; and
   to trigger a signal based on the decision.

6. Driving assistance system (100) comprising:
   a driver attention module (110) configured to receive, from at least one input source, information comprising at least one indicator, wherein the at least one indicator indicates a current attention of a driver of the motor vehicle, the at least one input source comprising an electronic device, and wherein the module is configured to receive information about a current use, by the driver, of the electronic device, the information about the current use of the electronic device comprising frequency of use and duration of use, and wherein the current use of the electronic device reduces a degree of attention; to decide, based on the current attention, whether the driving assistance system is to interfere in a current driving operation of the motor vehicle; and to trigger a signal based on the decision; and a driver fatigue module (120) which cooperates with the driver attention module (110), wherein the decision further comprises deciding, based on a combination of attention analysis and fatigue analysis, whether to interfere in the current driving operation.

7. Driving assistance system (100) according to claim 6, wherein the driver fatigue module (120) is designed to detect a viewing direction of the driver, and wherein the driver attention module (110) is configured to decide, taking into account the detected viewing direction, whether to interfere in the current driving operation.

8. Driving assistance system (100) according to claim 6, wherein the driver fatigue module (120) is designed to determine a driving time and/or an ability of the motor vehicle to stay in a traffic lane, and wherein the driver attention module (110) is configured to decide, taking into account the determined driving time and/or the determined ability to stay in a traffic lane, whether to interfere in the current driving operation.

9. Driving assistance system (100) according to claim 6, wherein the driving assistance system (100) is configured, based on the triggered signal, to control the motor vehicle.

\* \* \* \* \*